Figure 1:
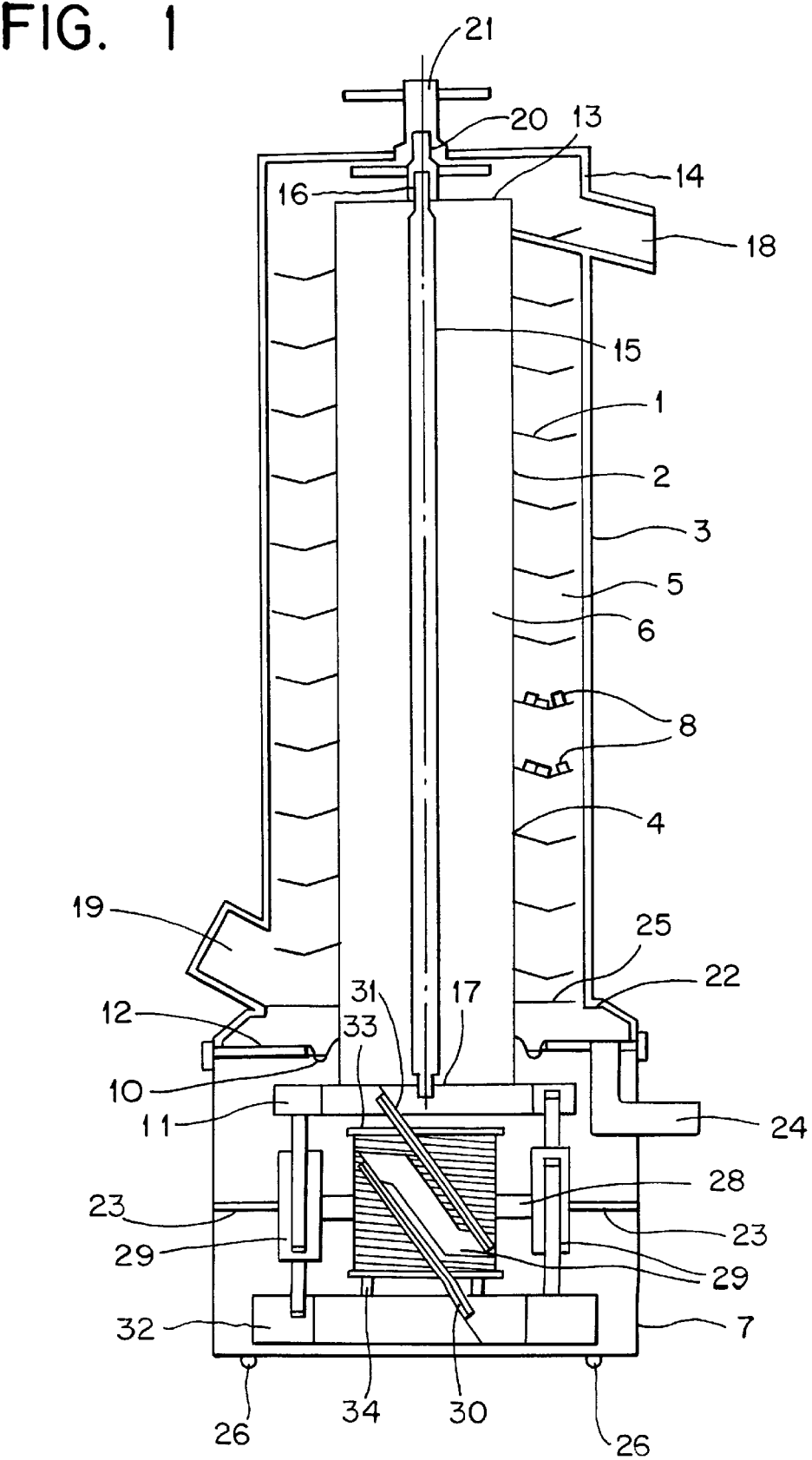

United States Patent [19]

Illi

[11] Patent Number: 5,931,286

[45] Date of Patent: Aug. 3, 1999

[54] DRIVING UNIT FOR VIBRATION CONVEYORS

[75] Inventor: Thomas Illi, Ellikon an der Thur, Switzerland

[73] Assignee: Kramer AG Basserdorf, Basserdorf, Switzerland

[21] Appl. No.: 08/860,309

[22] PCT Filed: Feb. 27, 1996

[86] PCT No.: PCT/CH96/00060

§ 371 Date: Oct. 27, 1997

§ 102(e) Date: Oct. 27, 1997

[87] PCT Pub. No.: WO96/26873

PCT Pub. Date: Sep. 6, 1996

[30] Foreign Application Priority Data

Feb. 28, 1995 [CH] Switzerland ............................. 565/95

[51] Int. Cl.⁶ ........................... B65G 27/24; B65G 27/02
[52] U.S. Cl. ........................................... 198/769; 198/756
[58] Field of Search .................................. 198/756, 757, 198/769

[56] References Cited

FOREIGN PATENT DOCUMENTS

| 0549533 | 6/1993 | European Pat. Off. . |
| 2369983 | 6/1978 | France . |
| 480248 | 10/1969 | Switzerland . |
| 2086003 | 5/1982 | United Kingdom . |

*Primary Examiner*—William E. Terrell
*Assistant Examiner*—K W Bower
*Attorney, Agent, or Firm*—Edwin D. Schindler

[57] ABSTRACT

A driving unit includes an electromagnet (33), a vibration plate (11) arranged on one side of the electromagnet (33), and a complementary vibration plate (32) arranged at the opposite side of the electromagnet (33). The parts (1, 2) of the vibration conveyor that need to vibrate are firmly secured to the vibration plate (11). The electromagnet is secured to the complementary vibration plate (32) in a vertically adjustable manner. The vibration plate (11) and the complementary vibration plate (32) are elastically connected to each other. The elastic connection is ensured by at least three supporting beams (29) that are uniformly distributed around the circumference of the winding of the electromagnet (33) at an oblique angle with the winding axis of the electromagnet (33). The supporting beams (29) are connected to the vibration plate (11) and to the complementary vibration plate (32) by leaf spring sets (30, 31). The supporting beams (29) are firmly secured to a stationary base (7) and represent the only connection between the driving unit and the non-vibrating parts of the vibration conveyor. The mass of the vibrating parts is thus considerably reduced in comparison with conventional vibration conveyor drives, and the efficiency of the drive is correspondingly improved.

10 Claims, 2 Drawing Sheets

5,931,286

DRIVING UNIT FOR VIBRATION CONVEYORS

This invention relates to a driving unit for vibration conveyors as used in a variety of embodiments for conveying small parts. They work on the principle that a spiral or circular-shaped track is made to vibrate, with the motion generated essentially comprising both a horizontal and a vertical component. The material to be conveyed may be small parts made from highly varied materials that need to be e.g. sorted, inspected and filled into drums as part of a production process. Sorting pots driven in this way cause the small parts inside to move around the edge of the sorting pot, with only those small particles that find themselves in a certain position being able to negotiate a particular sorting passage, whilst the others fall back into the pot. Another special version of a vibration conveyor serves to simultaneously smooth and remove dust from pharmaceutical products such as tablets or pills. EP 0 549 533 Al describes a tablet smoother of this type, as used immediately after the tablet presses in the tablet production process. It conveys the tablets upwards, simultaneously smoothing and dedusting them as it does so. This tablet smoother has a helical track which runs along the inside wall of a vertical jacketed pipe and can be made to vibrate with a horizontal and vertical component. This vibration jerks the tablets up along the helical track. A vacuum device is used to suck away the dust from the area above the helical track. The vibration is generated by an electromagnet mounted on a base, by which means a magnetic vibration plate disposed at a distance from the base, to which plate the helical track is directly and securely attached, can be attracted against the elastic force of leaf springs disposed at an oblique angle to the winding axis of the electromagnet between the base and the vibration plate.

One disadvantage of the drive of this vibration conveyor and tablet smoother is that the base of the entire device constitutes the complementary vibration mass and hence is unavoidably made to vibrate as well, and this vibration has to be absorbed by rubber feet. The same is also true of sorting pots driven in this way. Because vibration conveyors of this type have no part that remains at rest when the unit is operated, the entire housing vibrates as well, as does the stand, the base, and indeed every other part on them. Hence the energy consumed is not only spent on making those parts vibrate which are actually meant to vibrate; other additional components are also unavoidably made to vibrate although there is no need at all for them to do so, which has a negative effect on the efficiency of the vibration conveyor. Because the base necessarily functions as the complementary vibration mass it has to be of a relatively heavy design to be able to safely support the vibration conveyor and the rubber feet have to be capable of absorbing its vibration so that the entire vibration conveyor stands stationary on the ground when operated.

It is the task of this invention to provide a driving unit for a vibration conveyor for conveying small parts, which converts the energy consumed more efficiently than conventional constructions in that less mass is made to vibrate and in that the vibration conveyor is also provided with resting parts which can support any required additional devices that need not, or are not intended to vibrate as well.

This task is solved by a driving unit for conveying small parts according to the preamble of claim 1 that is distinguished by the characterizing features of said claim 1.

In comparison with conventional constructions, a driving unit of this type is compacter and only consumes about half as much electrical energy to achieve the same effect as the conventional driving unit in the construction described in EP 0 549 533 Al. The base on which it stands is no longer exposed to any vibration and additional devices that remain absolutely still, i.e. do not vibrate when the unit is in operation can be mounted on it. In comparison with a conventional construction, a driving unit of this type makes it possible to convey the materials over a greater height with the same amount of energy.

Figure 2:
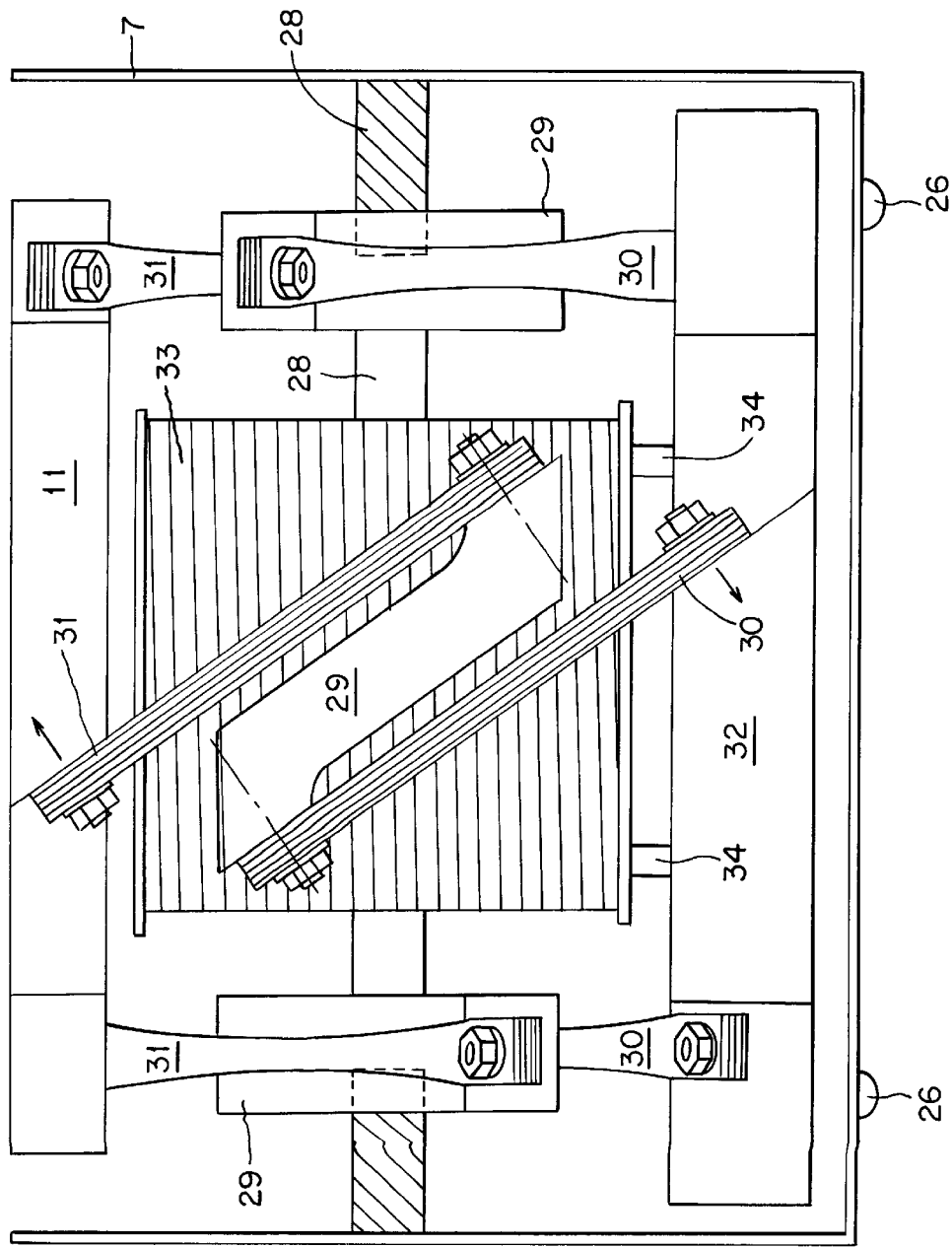

An advantageous embodiment of the driving unit according to the invention will now be explained in detail in the description below with reference to the Figures, in which:

FIG. 1 is a side view of a cross-section of the driving unit integrated in a tablet smoother, FIG. 2: shows the driving unit of the vibration conveyor in detail.

FIG. 1 shows the driving unit according to the invention in use in a vibration conveyor. It is accommodated here inside the housing of a base 7 and consists of an electromagnet 33 and four supporting beams 29 distributed around its circumference and disposed at an oblique angle to the winding axis of the electromagnet, each of which supports a set of springs 30,31 at the top and the bottom. The top sets of springs 31 are securely connected above the electromagnet 33 by their top ends with a vibration plate 11, whilst the bottom sets of springs 30 are securely connected below the electromagnet 33 with a complementary vibration plate 32. The electromagnet 33 is free-standingly attached to the complementary vibration plate 32. When the unit is operated, the supporting beams 29 form stationary poles and are securely connected as such with the base 7, which supports the entire driving unit plus the conveyor track that needs to be driven. The vibration conveyor shown here is also designed as a tablet smoother. The vibrations generated by the driving unit convey the small parts, i.e. the tablets, upwards on the helical, channel-like track 1 whose inside edge 4 winds around the outside of a support pipe 2. The track 1 is advantageously made from chromium steel and forms a channel in that it is slightly bent in the middle in its cross-section. This configuration ensures that, particularly where the small parts being conveyed are tablets, they are conveyed in a horizontal position. Even if some tablets occasionally move into a vertical position as a result of the vibrations, the channel shape ensures that they resume a horizontal position very quickly. Furthermore, this bend also ensures that the tablets never get stuck on the track. A jacketed pipe 3, which is advantageously made from Plexiglas to allow an unobstructed view of the track 1, is fitted at a minimal radial distance over the support pipe 2 and the track 1 that winds upwards around its outside. A lid 14, with a discharge chute 18 at the point where the track 1 ends is fitted over the top end of the jacketed pipe 3. At the bottom, where the track 1 starts, a feed chute 19 is contrived in the jacketed pipe 3. The support pipe 2 is mounted on the vibration plate 11 connected with the driving unit as it is needs to vibrate together with the channel-like track 1. Running along the axis of the central support pipe 2 there is a round bar 15 with threads 16,17 at each end. The bottom end of the round bar 15 is securely screwed to the vibration plate 11 of the driving unit by means of thread 17.

The support pipe 2 is topped by a lid 13 which tensions the support pipe 2 with the vibration plate 11 via the round bar 15 by means of a screw stopper 20. As already described, the jacketed pipe 3 is closed off with a lid 14 and rests on the housing of the base 7. The housing is closed off at the top by a circular cover plate 12. Between the cover plate 12 and the support pipe 2 a lip seal 10 ensures an elastic dustproof, airtight connection between the vibrating support pipe 2 and the stationary cover plate 12. The dust between the support pipe 2 and the jacketed pipe 3 generated in this area 5 due to the tablets 8 rubbing against each other can be continuously sucked downwards and out via the connecting element 24. The vibration plate 11 that supports the support pipe 2 and the helical track I is mounted on four pairs of leaf spring sets 30,31. The essential feature of the driving unit is the arrangement of these leaf spring sets 30,31. It is namely this special arrangement which ensures that neither the base 7 nor the jacketed pipe 3 supported by it are made to vibrate, i.e. are not exposed to any vibrations. Here, the base 7 is constituted by a round, container-like metal box to whose underside rubber feet 26 are attached. A horizontal metal ring 28, which is shown here from the side and which winds round the electromagnet 33 at a radial distance, runs round about half way up the metal box. Distributed around its outer circumference the four supporting beams 29 are secured at an oblique angle in relation to its plane, at an angle of approx. 35° in relation to the plane of the metal ring. For this purpose recesses are contrived in the outside edge of the ring 28, in which the supporting beams 29 are laid and screwed securely into place. These supporting beams 29 are securely connected with the base 7 via bolts 23 that run radially outwards. The supporting beam 29 nearest to the viewer of FIG. 1 is shown from the side. One leaf spring set 30,31 runs parallel to its top side and parallel to its bottom side. The bottom end of the top leaf spring set 31 is securely screwed to the top side of the supporting beam 29 whilst its freely vibrating top end is secured to the vibration plate 11. The other three top leaf spring sets are arranged in exactly the same way. The top end of the bottom leaf spring set 30, however, is securely fixed to the supporting beam 29 and its freely vibrating bottom end is securely connected to a complementary vibration plate 32. The other three bottom leaf spring sets 30 are also arranged in the same way. The electromagnet 33 sits on the complementary vibration plate 32 and is fixed to the complementary vibration plate 32 by means of threaded bolts 34, thereby allowing it to be vertically adjusted. Hence the electromagnet 33 takes up the space inside the ring 28, with its winding axis coinciding with the central axis of the overall conveyor device, along which the round bar 15 also runs. The support pipe 2 with the helical track 1 rests on the vibration plate 11 and the jacketed pipe 3 rests on the top edge of the metal box, i.e. the base 7. The top vibration mass is thus constituted by vibration plate 11, support pipe 2 and the helical track 1, and the bottom vibration mass, which functions here as the complementary vibration mass, is constituted by complementary vibration plate 32 and the electromagnet 33 mounted on it. The top and bottom vibration masses are connected with each other via the leaf spring sets 30,31 and the supporting beams 29 disposed around ring 28, with the supporting beams remaining stationary when the unit is operated, i.e. they are not made to vibrate. This means that the base 7 and the jacketed pipe 3 resting on it also remain stationary, i.e. these parts are not subject to any vibration.

If the electromagnet 33 now attracts vibration plate 11 by magnetic force, the leaf spring sets 30,31 are slightly deflected against their elastic force, which simultaneously causes vibration plate 11 to rotate slightly. In the example shown, looking at the vibration plate 11 from above, this rotation is clockwise when vibration plate 11 is attracted downwards. When the electromagnet 33 is switched off, the leaf springs 30,31 cause the vibration plate 11 to move back quickly in exactly the opposite direction. The complementary vibration plate 32 makes precisely the opposite movement. The described motion of vibration plate 11 is transferred to the support pipe 2 and the helical track 1, whereupon a movement of, for example, approximately 4 mm amplitude is generated, which has a horizontal component due to the rotation and a vertical component due to the up and down movement of vibration plate 11. When the unit is operated, the small parts 8 are fed onto the bottom of the track 1 via the feed chute 19. On the helical track 1, each cycle of motion propels them forwards at an angle and upwards in relation to the track and they finally come to land on track 1 some distance on. The frequency and amplitude of the vibration selected for operating the device will naturally depend on the characteristic frequency of the overall arrangement and can be regulated by means of a device for controlling the electromagnet 33. A typical frequency will be in the range of about 40 to 60 Hz. Hence the small parts 8 end up being conveyed up and along the helical track 1 by this device. Since the small parts are thoroughly vibrated over a relatively long period of time, the mechanical stress they are exposed to can be used, for example, to smooth the tablets. The roughness that is removed is continuously sucked away from zone 5 in the form of dust so that the tablets 8, after bouncing up the entire length of the track, end up being ejected through the device's top discharge chute 18 completely smooth and dedusted. No height is lost during the entire smoothing and dust-removing process; on the contrary, height is won in that the tablets 8 are moved upwards along the helical track 1 as a result of the typical vibration. In a device of this type, the helical track 1 can extend as shown over many curves and hence over several metres, thereby ensuring a correspondingly long dwell-time and processing time for the individual tablets. The conveyor speed also makes it possible to convey several 100,000 small parts per hour and to smooth and dedust them as well if required. The actual height over which they are conveyed can also amount to several metres.

FIG. 2 shows an enlarged view of an alternative embodiment of the driving unit. At the top one sees the vibration plate 11, on which the support pipe and the helical track (not shown here) are securely mounted, and the complementary vibration plate 32 at the bottom. The entire construction is accommodated in the housing of a base 7, which rests on rubber feet 26. Approximately half way up the inside of base 7 there is a ring 28, which runs horizontally around the base 7 outside supporting beams 29. In FIG. 2 this ring 28 is shown in cross-section. The four supporting beams 29 are positioned in recesses in this ring 28, said recesses being cut out of the inside edge area instead of the outside edge area as in the embodiment shown in FIG. 1. For the sake of clarity, the supporting beam 29 nearest the viewer is also shown in this drawing with its two leaf spring sets 30,31, although the front semicircle of the ring 28 is not shown. Instead of having a ring run round the housing, four bolts screwed securely to the housing can also be used, each of which securely connects a supporting beam to the base 7 in the desired position. In one variation, an embodiment with just three supporting beams and leaf spring sets distributed around the circumference may be selected instead of four supporting beams with two leaf spring sets each. The individual leaf spring sets consist of a plurality of leaf springs of the type illustrated. At both ends they have an assembly hole and are tapered towards their longitudinal centre. This tapering is advantageous because it provides a bending line which exposes the spring material to approximately the same stress everywhere. Tests have shown that leaf springs of uniform strength tend to break due to fatigue near the assembly holes after a relatively short period of use.

These breaks occur because the springs are subject both to twisting and bending. In a uniformly strong spring, the twist distributes itself evenly over the entire length of the spring and hence breaks unavoidably occur at the weakest point, namely near the assembly hole, because this is where the spring also runs into a stationary zone. No fatigue breaks were noted with the springs of the type shown here. Due to the taper, the extent of the twisting or torsion is greatest at the longitudinal centre and it declines towards the ends of the springs so that the latter are exposed to less stress in the vicinity of the assembly holes. To preserve the individual springs of a set, spacer washers are used to space them about 0.5 mm from each other. This prevents the individual springs from shearing against each other. In the middle of the ring 28 stands the electromagnet 33, which is connected to the complementary vibration plate 32 by four threaded bolts 34. The height of the electromagnet 33 can be adjusted by turning these threaded bolts 34. As part of this arrangement the base 7, ring 28 and the four supporting beams 29 will now always remain stationary and will not vibrate, even when the unit is in operation.

This driving unit for vibration conveyors, which can be used both for merely conveying or sorting small parts as well as for smoothing and removing dust from tablets as required, converts the electrical energy it consumes into conveying output at a rate of efficiency never yet achieved to date. Only those masses which actually need to vibrate are made to vibrate. For the first time, stationary poles were contrived on a driving unit of this type so that the other components connected with the driving unit remain absolutely stationary and are not exposed to any vibration.

I claim:

1. Driving unit for a vibration comprising, a vibration plate an electromagnet on the top side of the electromagnet, vibrating parts of the conveyor being firmly secured to the vibration plate, and a suspended complementary vibration plate (32) disposed on the opposite side of the electromagnet from the vibration plate to which the electromagnet is secured has been inserted in a vertically adjustable manner, with an elastic connection between the vibration plate and the complementary vibration plate, characterized in that this elastic connection is ensured by at least three supporting beams that are uniformly distributed around the circumference of the electromagnet at an oblique angle to the axis of the electromagnet, each of the supporting beam being connected at the top to the vibration plate by an upwardly projecting leaf spring set and at the bottom to the suspended complementary vibration plate by another downwardly projecting leaf spring set, and the supporting beams being firmly secured to a stationary base, this connection representing the only connection between the driving unit and the stationary base of the vibration conveyor such that when alternating voltage is applied to the electromagnet only the vibration plate and the parts connected to the vibration plate plus the electromagnet and the complementary vibration plate are made to vibrate.

2. The driving unit of claim 1, wherein the elastic connection between the vibration plate and the complementary vibration plate is ensured by four supporting beams that are uniformly distributed around the circumference of the winding of the electromagnet at an oblique angle to the winding axis of the electromagnet.

3. The driving unit of claim 1, wherein, the only connection between the driving unit and the stationary base of the vibration conveyor is realized by means of bolts which are secured on the outside of the supporting beams and proceed outwards relative to the electromagnet in a radial direction to the stationary base where they are firmly secured to the stationary base.

4. The driving unit of claim 3, wherein the insides of the individual supporting beams nearest to the electromagnet are securely connected to a ring that disposed around the electromagnet.

5. The driving unit of claim 1 wherein the only connection between the driving unit and the stationary base of the vibration conveyor comprises a ring which is disposed around the outside of the supporting beams and the electromagnet to which the supporting beams are attached, to the outside of the ring being securely connected to the base.

6. The driving unit of claim 4, wherein recesses that run obliquely to the plane of the ring are cut into the ring that runs round the outside or the inside of the supporting beams, into which the supporting beams fit and in which they are securely screwed in place.

7. The driving unit of claim 1 wherein the individual springs of the spring sets comprise several leaf springs set apart by means of spacer rings, which are continually tapered towards their longitudinal centre and have an assembly hole at each end.

8. The driving unit of claim 1 wherein standing on its vibration plate there is a support pipe which is securely tensioned with the vibration plate and around which runs a helical, channel-like track, in that a jacketed pipe with a feed chute at the bottom and a discharge chute at the top is fitted over this track at a minimal radial distance, with the jacketed pipe being exclusively and securely connected with the stationary base hence does not vibrate, and in that there is a vacuum device for sucking away dust from the area (5) between the support pipe (2) and the jacketed pipe (3).

9. The driving unit of claim 1, wherein the electromagnet is connected at a distance with complementary vibration plate by means of threaded bolts so that the magnet can be vertically adjusted on the complementary vibration plate.

10. The driving unit of claims 1, wherein the vibration plate is firmly secured to a sorting pot.

* * * * *